Feb. 12, 1929.
J. R. GAMMETER
1,702,112
TIRE FORMING APPARATUS
Filed Feb. 6, 1926
3 Sheets-Sheet 1
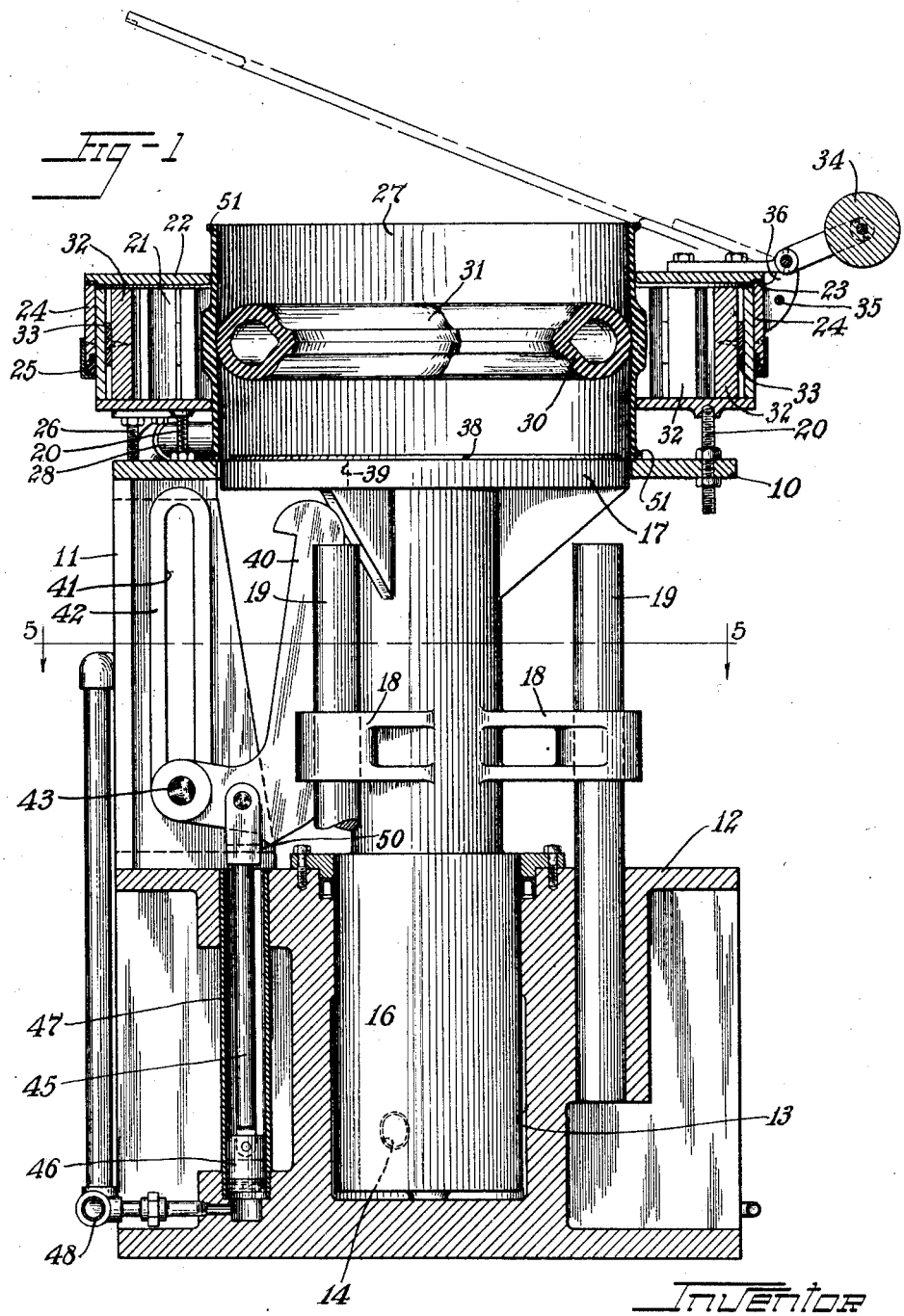
Inventor
John R. Gammeter
By Pierson, Eskin & Avery
Attys

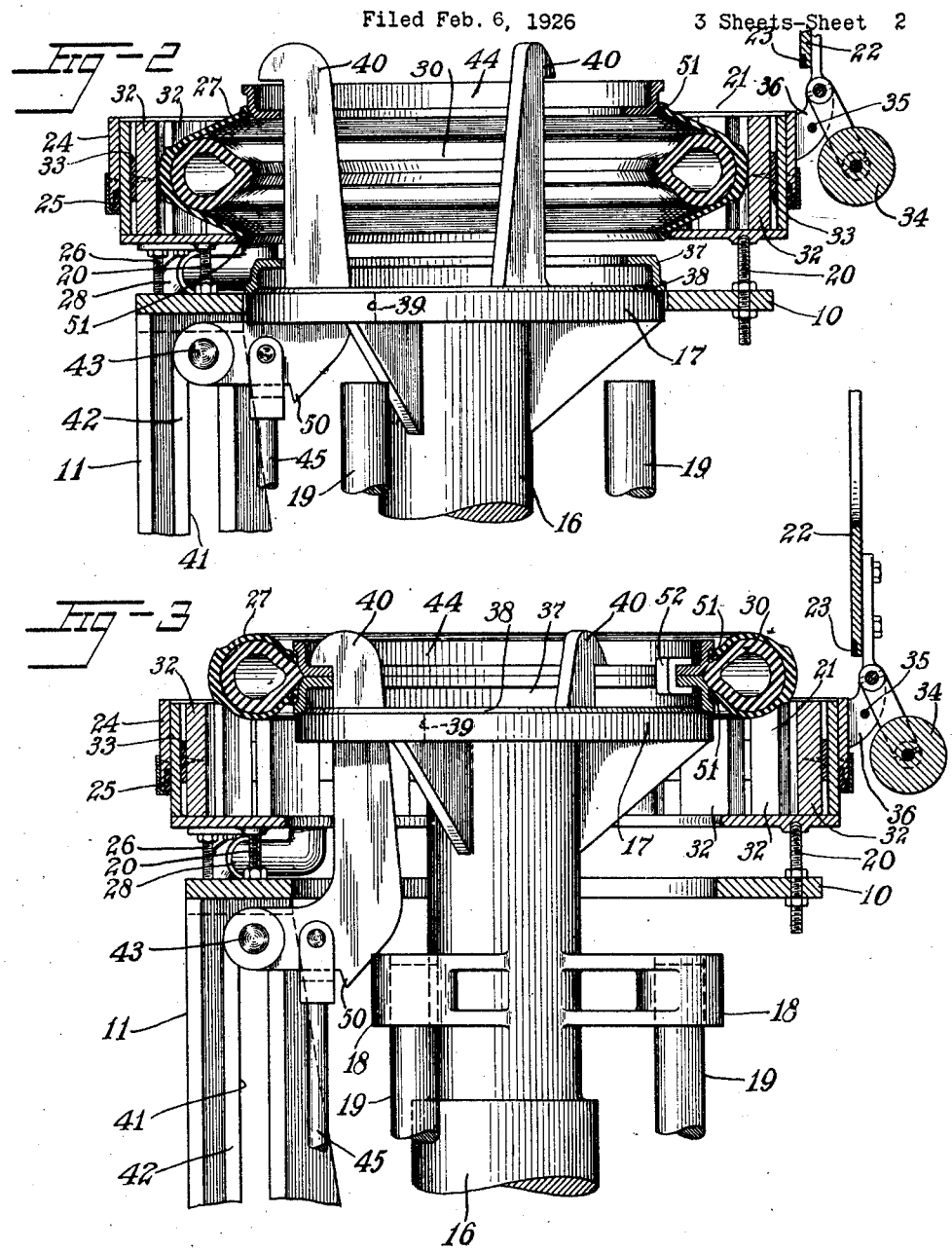

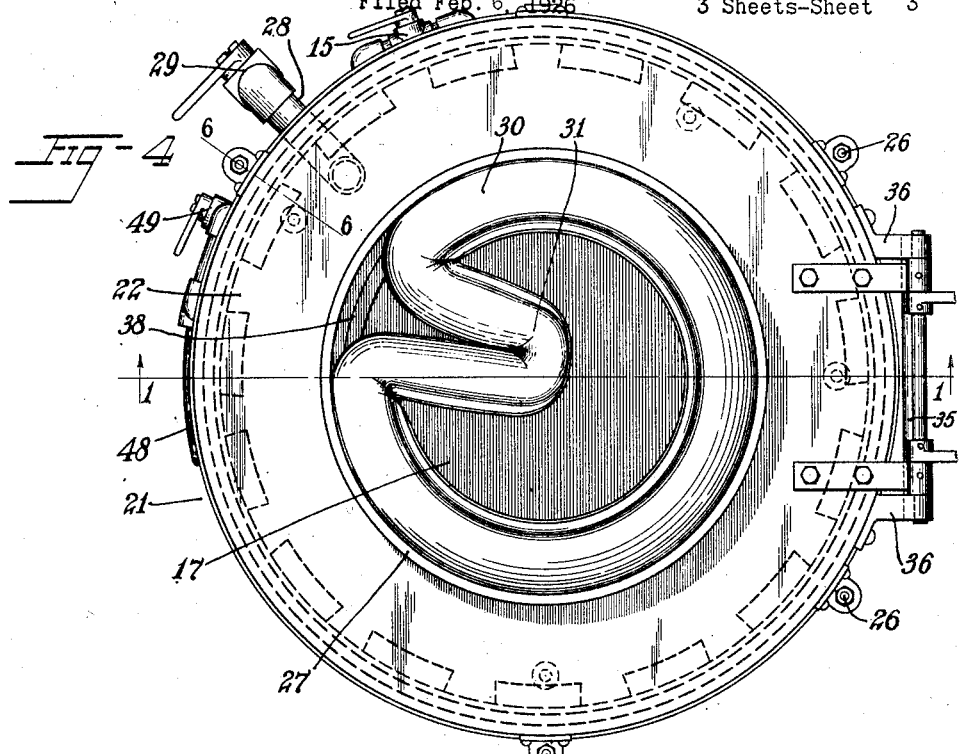
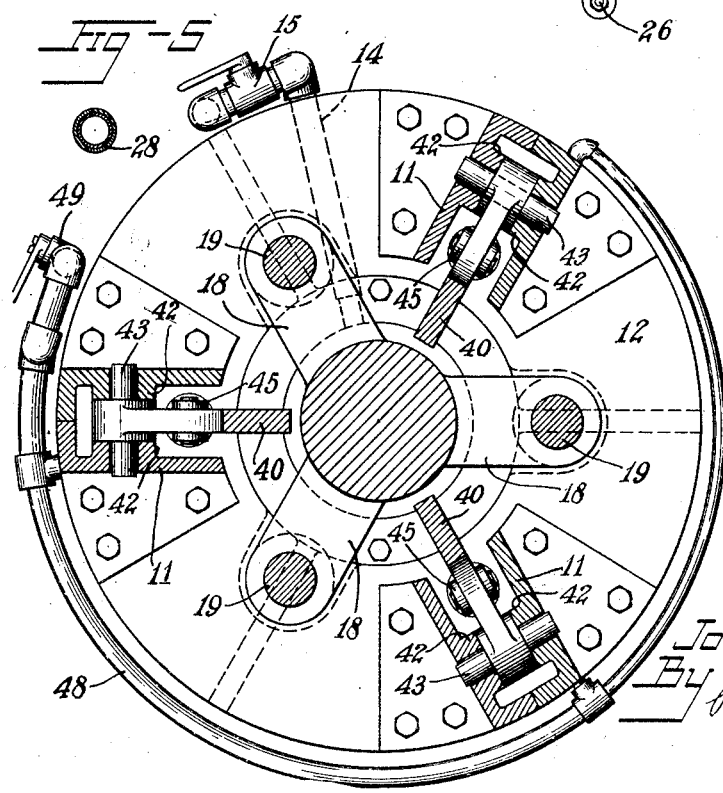
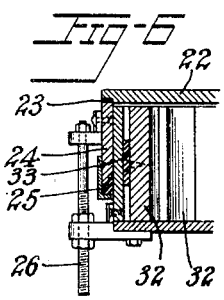

Patented Feb. 12, 1929.

1,702,112

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

TIRE-FORMING APPARATUS.

Application filed February 6, 1926. Serial No. 86,608.

This invention relates to procedure and apparatus for forming pneumatic tire casings or the like, and is of especial value in mounting tires shaped from "flat" bands upon the bead-clamping rings upon which they are vulcanized, although not wholly limited thereto.

My chief objects are to provide improved procedure and apparatus for mounting a tire upon a pair of bead clamping rings. A more specific object is to provide for performing this operation in conjunction with the shaping of a transversely flat tire band to tire form, so that the several operations of shaping the tire, mounting an expansible core therein and mounting the tire and core upon the bead clamping rings may be performed in the same machine and with rapidity and economy.

Of the accompanying drawings:

Fig. 1 is a vertical section, on line 1—1 of Fig. 4 of a machine embodying and adapted to carry out my invention in its preferred form, at an early stage of operation.

Fig. 2 is a vertical section of parts thereof at a succeeding stage.

Fig. 3 is a vertical section of the same at a later stage.

Fig. 4 is a plan view of parts of the apparatus and the work therein at the early stage of operation shown in Fig. 1.

Fig. 5 is a horizontal section on line 5—5 of Fig. 1.

Fig. 6 is a section on line 6—6 of Fig. 4.

Referring to the drawings, the machine comprises a stationary annular table 10 supported upon three pairs of legs or standards 11, 11 which rise from a base casting 12 centrally formed as a vertical ram cylinder 13 which is provided with a fluid supply and discharge pipe 14 controlled by a suitable three-way valve 15. Mounted in the said cylinder is a ram 16 having a head 17 adapted to lie within and with its upper face approximately flush with the top of the annular table 10 when the ram is in its lowest position, as in Fig. 1. The ram is formed, below its head, with three laterally projecting guide brackets 18, 18 slidably mounted upon respective guide posts 19, 19 rising from the base-casting 12, to avoid cramping of the ram.

Mounted upon a set of supporting and spacing screws 20, 20 adjustably mounted in the annular table 10 is an annular suction box 21 having an annular hinged lid 22 which is provided with a sealing gasket 23 inset in its outer margin and adapted to seal against the upper edge of a cylindrical sleeve 24 to which the lid 22 is hinged, the said sleeve being provided with a gasket 25 and telescoped upon the suction box 21. The said sleeve 24 is adjustably supported by a set of supporting screws 26, 26 and adapted to be raised or lowered thereon to vary the height of the chamber defined by the suction box 21, sleeve 24 and lid 22, for shaping tires of different sizes in cross-section. The suction box 21 and lid 22, when the latter is closed, as in Fig. 1, are adapted to receive a transversely flat tire-band 27 against their inner edges, with the lower edge of the tire band resting upon the inner margin of the annular table 10, so that the tire-band forms a closure for the chamber above mentioned and may be drawn out substantially to tire form by suction applied to the chamber, for which a telescopic suction conduit 28 provided with a suitable three-way valve 29 is provided.

In Figs. 1 and 4 an expansible tire core 30 is shown within the tire-band, in position to follow the middle zone of the tire-band outward as the latter is shaped, the core being distorted in an involute fold 31 to permit it to fit within the unexpanded tire-band, and in Figs. 2 and 3 the core 30 shown in its normal circular form within the shaped tire-band.

An annular series of stop-blocks 32, 32 are secured to a surrounding metal band 33 and removably mounted in the suction box to limit the expansion of the tire-band. The lid 22 may be provided with a counterweight 34 and adapted to be limited in its lid-opening movement, with an over-center effect, by a stop-bar 35 mounted between the lid's hinge brackets 36, 36.

The suction box 21 and sleeve 24 are held so spaced above the table 10 by the screws 20 and 26 and the screws are so spaced apart circumferentially of the table as to permit the insertion of a lower bead-clamping ring 37 from the side, into the space between the table and the suction box after the adjacent margin of the tire-band has been lifted from the table by the shaping operation, and the upper face of the ram-head 17 is formed about its outer periphery with an outwardly facing annular shoulder 38 adapted to interfit with a complemental face formed on the bead-clamping ring to center the latter upon the ram-head.

The ram-head is formed with three apertures extending vertically therethrough, one of the apertures being shown at 39, Figs. 1 to 3, for the passage of respective bead-ring-engaging hooks 40, 40. Each of the said hooks is pivotally and slidably mounted in one of the pairs of table legs or standards 11, the standards of each pair being formed with registered guide slots 41 surrounded by machined bosses 42, and the hook 40 being of general L-shape and having the toe of the L slidably mounted between the bosses 42 of the standards 11 and provided with a pivot pin 43 secured in the hook member and having its end portions slidably mounted in the guide slots 41 of the standards.

For simultaneously raising the three hooks 40 through the ram head 17, into position to engage an upper bead-clamping ring 44, while permitting them to remain in inwardly tilted positions so as to pass through the rings, each hook has pivoted to the foot of the l, at a point outward from its center of gravity, the upper end of a connecting rod 45 running to a piston 46 mounted in a cylinder 47 which is secured in the base-casting 12, the three cylinders being provided with a manifold 48 controlled by a suitable three-way valve 49 for simultaneously charging and exhausting their lower ends. Each hook 40 is formed with a stop lug or shoulder 50 adapted to contact the head of the connecting rod 45 to limit the inward tilting movement of the hook.

In the operation of the machine the tire-band 27 and core 30 are mounted therein as shown in Figs. 1 and 4, with the machine parts in the position there shown and with the valve 29 closed so that the interior of the suction box is at atmospheric pressure.

Suction is then applied to the annular chamber defined by the suction box assembly and the tire-band by operating the valve 29, which causes the tire-band to be sucked out substantially to tire form and the core to spring out to its normal circular form within the shaped band, the bead portions of the band sliding toward each other on the inner edges of the suction box 21 and lid 22 respectively until stopped by the engagement of the beads, 51, 51, of the band with the said members.

The lid 22 is then raised, the upper bead-clamping ring 44 is laid upon the upper bead of the tire as in Fig. 2, and the lower bead-clamping ring 37 is introduced from the side of the machine and mounted upon the ram-head 17 in the position shown in Fig. 2.

The hooks 40 are then simultaneously raised to the positions of Fig. 2 by operating the valve 49, the hooks moving upward in inwardly tilted positions, by reason of their centers of gravity being inward of the machine from the connecting rods 45, so that the hooks in their upward movement clear the bead-clamping rings. At the end of their upward movement contact of their pivot pins 43 with the upper end walls of the slots 41 causes the hooks to swing outwardly to the positions of Fig. 2 so that their hooked upper end portions overlie the upper bead-clamping ring.

While the hooks are so held by the cylinders 47 the ram 16 is raised by operating the valve 15, carrying upward with it the lower bead-clamping ring and tire assembly and forcing the bead-clamping rings together against the hooks 40 to seat the rings within the tire and core and abut the rings against each other as shown in Fig. 3. Suitable U-clamps such as the clamp 52, Fig. 3, are then applied to the rings to hold the assembly in the relation shown, after which the ram cylinder and the hook-lifting cylinders are exhausted, permitting the ram and the hooks to descend to their starting positions and releasing the rimmed tire assembly, which is then lifted from the ram-head and removed from the machine for vulcanization. The operation as described is then repeated.

My invention provides simple, compact and economical apparatus for performing the operations described, and is susceptible of modification within its scope as defined in the appended claims.

I claim:

1. Tire-forming apparatus comprising a suction box adapted to shape an endless band of tire-building material approximately to tire form by suction, means for supporting said box with a space adjacent thereto adapted to admit a bead-clamping ring, from a direction transverse to the axis of a band mounted in the box, into axial alignment with the band, and means for pressing the aligned bead-clamping ring against the band.

2. Tire-forming apparatus comprising a suction box adapted to shape an endless band of tire-building material approximately to tire form by suction, a bead-ring-pressing member mounted for movement axially toward said suction box, and a set of bead-clamp-ring hooks mounted for movement through the central space of said suction box.

3. Tire-forming apparatus comprising means for supporting a U-shaped tire-band with its bead portions unobstructed for the reception of a pair of bead-clamping rings, a set of hooks adapted to be moved to project their hooked ends through the tire-band, so supported, means for so moving the hooks with their hooked ends held inward to clear the band and then spreading the hooks outwardly, and a presser member adapted to coact with said hooks to force the beads of the tire-band toward each other.

In witness whereof I have hereunto set my hand this 28th day of January, 1926.

JOHN R. GAMMETER.